US011482899B2

(12) United States Patent
Yanagihara et al.

(10) Patent No.: US 11,482,899 B2
(45) Date of Patent: Oct. 25, 2022

(54) ROTATING ELECTRICAL MACHINE WITH ROTOR HAVING ARC SHAPED PERMANENT MAGNETS

(71) Applicant: TDK Corporation, Tokyo (JP)

(72) Inventors: Ko Yanagihara, Tokyo (JP); Atsushi Tada, Tokyo (JP); Shinji Yoshida, Tokyo (JP)

(73) Assignee: TDK Corporation, Tokyo (JP)

(*) Notice: Subject to any disclaimer, the term of this patent is extended or adjusted under 35 U.S.C. 154(b) by 90 days.

(21) Appl. No.: 16/708,721

(22) Filed: Dec. 10, 2019

(65) Prior Publication Data

US 2020/0195072 A1 Jun. 18, 2020

(30) Foreign Application Priority Data

Dec. 14, 2018 (JP) .............................. JP2018-234578

(51) Int. Cl.
*H02K 1/27* (2022.01)
*H02K 1/276* (2022.01)
*H02K 21/14* (2006.01)

(52) U.S. Cl.
CPC ........... *H02K 1/2766* (2013.01); *H02K 21/14* (2013.01); *H02K 2213/03* (2013.01)

(58) Field of Classification Search
CPC ...... H02K 1/274; H02K 1/276; H02K 1/2766; H02K 21/14; H02K 2213/03
USPC ............. 310/156.45, 156.46, 156.53, 156.57
See application file for complete search history.

(56) References Cited

U.S. PATENT DOCUMENTS

| 3,293,466 A | * | 12/1966 | Henry-Baudot | ....... | H02K 23/04 310/154.46 |
| 3,554,101 A | * | 1/1971 | Grant | ...................... | E02D 3/026 404/121 |
| 3,554,110 A | * | 1/1971 | Goetz | .................... | B60H 1/248 454/164 |
| 3,554,112 A | * | 1/1971 | Herb | ........................ | F24F 11/74 251/5 |
| 3,554,183 A | * | 1/1971 | Grover | .................... | F28D 15/04 165/104.26 |
| 3,554,219 A | * | 1/1971 | Hudson | ..................... | E03D 1/32 137/414 |

(Continued)

FOREIGN PATENT DOCUMENTS

| CN | 106134046 A | 11/2016 |
| JP | H11-262205 A | 9/1999 |

(Continued)

OTHER PUBLICATIONS

JP-2002044889 English Translation form ip.com.*

*Primary Examiner* — Maged M Almawri
(74) *Attorney, Agent, or Firm* — Faegre Drinker Biddle & Reath LLP

(57) ABSTRACT

It has been confirmed that even though there is a difference in the dimension of a perpendicular reference surface of a permanent magnet, there is almost no change in surface magnetic flux density, and variations in the dimension of the perpendicular reference surface do not much affect the surface magnetic flux density. Therefore, even though variations occur in the dimension of the perpendicular reference surface, variations in the characteristics of an IPM motor are prevented.

5 Claims, 12 Drawing Sheets

(56) References Cited

U.S. PATENT DOCUMENTS

| | | | | |
|---|---|---|---|---|
| 3,554,242 A * | 1/1971 | Cleghorn | ............... | B01D 39/12 29/896.62 |
| 3,554,245 A * | 1/1971 | Eynon | ................. | A01G 23/085 144/34.1 |
| 3,554,267 A * | 1/1971 | Brinker | ................. | E06B 3/481 160/206 |
| 3,554,274 A * | 1/1971 | Herfeld | ................. | B01F 33/81 165/92 |
| 3,554,296 A * | 1/1971 | Lehman | ................ | A01B 13/02 172/744 |
| 3,554,297 A * | 1/1971 | Lehman | ................ | A01B 63/245 172/624.5 |
| 3,554,303 A * | 1/1971 | Zajkowski | ................ | E21B 7/28 175/62 |
| 3,554,319 A * | 1/1971 | Smith | ................... | B66F 11/046 182/2.4 |
| 3,554,320 A * | 1/1971 | Eggert, Jr. | ................ | B64F 1/31 182/98 |
| 3,554,341 A * | 1/1971 | Anderson | ........... | F16D 25/0638 192/105 A |
| 3,554,384 A * | 1/1971 | DeNatale | ........... | A47B 87/0276 220/23.6 |
| 3,554,391 A * | 1/1971 | Goodell | ................. | B65G 1/045 414/331.05 |
| 3,554,395 A * | 1/1971 | Dunbar | ................... | B66C 13/18 414/719 |
| 3,554,402 A * | 1/1971 | Lock | ................. | B65D 5/46184 229/117.22 |
| 3,554,420 A * | 1/1971 | Agius | .................... | G11B 15/38 |
| 3,554,431 A * | 1/1971 | Lock | ....................... | B65D 71/16 206/433 |
| 3,554,439 A * | 1/1971 | Sigl | ....................... | G06M 1/163 235/103 |
| 3,554,451 A * | 1/1971 | Aghnides | ................ | E03C 1/084 239/428.5 |
| 3,554,457 A * | 1/1971 | Hutzenlaub | ........... | B65H 75/08 242/545.1 |
| 3,554,471 A * | 1/1971 | Hantzsch | ................ | B64D 25/10 244/122 R |
| 3,554,473 A * | 1/1971 | Rakov | ..................... | E01F 9/692 248/910 |
| 3,554,478 A * | 1/1971 | Sunderman | ......... | A01M 7/0075 248/278.1 |
| 3,554,480 A * | 1/1971 | Rowe | .................... | E21B 33/062 251/282 |
| 3,554,484 A * | 1/1971 | Gachot | ................. | F16K 5/0631 251/315.13 |
| 3,554,488 A * | 1/1971 | Alexander | ............ | F16K 5/161 251/317 |
| 3,554,494 A * | 1/1971 | Bee | ..................... | E04H 17/1413 256/19 |
| 3,554,516 A * | 1/1971 | Denny | ..................... | C22B 3/02 210/189 |
| 3,554,523 A * | 1/1971 | Miller | ....................... | C21C 5/445 266/236 |
| 3,554,540 A * | 1/1971 | Green | ..................... | A63B 9/00 482/37 |
| 3,554,557 A * | 1/1971 | Fortune | ................... | G11B 3/60 369/264 |
| 3,554,559 A * | 1/1971 | Dahlheimer | ............ | F16J 15/36 277/391 |
| 3,554,564 A * | 1/1971 | Lassanske | ................ | F16J 9/00 92/172 |
| 3,555,205 A * | 1/1971 | Barkouki | ............... | G11B 5/0086 |
| 3,555,253 A * | 1/1971 | Seki | ................... | G05B 19/4103 318/162 |
| 3,555,257 A * | 1/1971 | Gray | ...................... | H03K 19/166 307/411 |
| 3,555,266 A * | 1/1971 | Dixon | ....................... | H04N 1/04 313/271 |
| 4,112,320 A * | 9/1978 | Mohr | ..................... | H02K 23/20 310/154.25 |
| 4,219,752 A * | 8/1980 | Katou | .................. | H02K 1/2786 310/156.19 |
| 4,256,417 A * | 3/1981 | Bohannon | ............. | E21B 17/017 405/203 |
| 4,390,853 A * | 6/1983 | Mathew | ................... | H01P 1/36 333/204 |
| 4,482,304 A * | 11/1984 | Brobeck | ................ | F04D 29/668 417/407 |
| 4,496,457 A * | 1/1985 | Schickel | .................. | B03C 1/03 209/222 |
| 4,609,332 A * | 9/1986 | Miki | ..................... | F04D 29/058 417/423.4 |
| 4,619,349 A * | 10/1986 | Braun | ................... | B64C 27/001 188/380 |
| 4,776,964 A * | 10/1988 | Schoendorfer | ..... | A61M 1/3696 210/651 |
| 4,829,205 A * | 5/1989 | Lindgren | ................ | H02K 99/20 310/125 |
| 4,831,298 A * | 5/1989 | Lindgren | ................ | H02K 49/02 310/125 |
| 4,831,300 A * | 5/1989 | Lindgren | ................ | H02K 21/12 310/113 |
| 4,834,628 A * | 5/1989 | Laing | .................... | H02K 49/106 417/420 |
| 4,862,128 A * | 8/1989 | Leupold | ................ | H01J 23/087 335/212 |
| 4,886,024 A * | 12/1989 | Meredith | .................. | F01B 3/04 123/223 |
| 4,891,567 A * | 1/1990 | Fujitani | ................. | H02K 21/227 318/400.41 |
| 4,897,075 A * | 1/1990 | Sharples | ................... | B04B 9/08 494/84 |
| 4,973,870 A * | 11/1990 | Uehara | ................. | F16D 27/112 310/78 |
| 5,105,113 A * | 4/1992 | Ishikura | ................. | H02K 23/04 310/154.29 |
| 5,191,250 A * | 3/1993 | Kobayashi | ............. | H02K 1/265 310/198 |
| 5,289,064 A * | 2/1994 | Sakamoto | .............. | H02K 37/12 310/49.53 |
| 5,319,270 A * | 6/1994 | Tanaka | ................. | H02K 11/215 310/216.096 |
| 5,327,034 A * | 7/1994 | Couture | ................... | B60L 15/20 310/67 R |
| 5,334,894 A * | 8/1994 | Nakagawa | ............. | H02K 37/12 310/156.55 |
| 5,336,955 A * | 8/1994 | Suzuki | ................. | H02K 5/1737 310/90 |
| 5,355,039 A * | 10/1994 | Couture | ..................... | H02K 7/14 310/67 R |
| 5,386,161 A * | 1/1995 | Sakamoto | .............. | H02K 37/14 310/156.55 |
| 5,394,283 A * | 2/1995 | Hans | ................... | G11B 19/2009 310/90 |
| 5,410,201 A * | 4/1995 | Tanaka | ................ | H02K 11/0141 310/67 R |
| 5,412,269 A * | 5/1995 | Couture | ................ | B60K 7/0007 310/67 R |
| 5,417,507 A * | 5/1995 | Uno | ..................... | G02B 26/121 384/107 |
| 5,438,228 A * | 8/1995 | Couture | .................. | B60L 15/20 310/67 R |
| 5,442,247 A * | 8/1995 | Suzuki | ................. | H02K 5/1735 310/67 R |
| 5,456,653 A * | 10/1995 | Wright | ..................... | F16D 3/12 494/84 |
| 5,552,650 A * | 9/1996 | Cap | ........................ | H02K 21/22 310/90 |
| 5,567,139 A * | 10/1996 | Weatherston | ......... | F04C 18/348 418/173 |
| 5,588,818 A * | 12/1996 | Houmand | ............... | F16D 1/0876 418/5 |
| 5,610,464 A * | 3/1997 | Asano | ..................... | H02K 29/03 310/216.097 |
| 5,681,153 A * | 10/1997 | Weatherston | ......... | F04C 18/348 417/462 |

(56) References Cited

U.S. PATENT DOCUMENTS

| | | | | | |
|---|---|---|---|---|---|
| 5,698,913 | A | * | 12/1997 | Yagi | B61C 9/46 310/58 |
| 5,719,452 | A | * | 2/1998 | Sugiura | H02K 37/20 310/49.19 |
| 5,723,921 | A | * | 3/1998 | Sugiura | H02K 37/20 310/49.19 |
| 5,744,895 | A | * | 4/1998 | Seguchi | B60K 6/365 903/952 |
| 5,751,089 | A | * | 5/1998 | Stridsberg | H02K 16/04 310/266 |
| 5,780,944 | A | * | 7/1998 | Sakamoto | H02K 37/12 310/179 |
| 5,783,893 | A | * | 7/1998 | Dade | H02K 16/00 310/266 |
| 5,804,935 | A | * | 9/1998 | Radev | B60L 50/60 318/539 |
| 5,880,544 | A | * | 3/1999 | Ikeda | H02K 21/22 310/90 |
| 5,898,990 | A | * | 5/1999 | Henry | H02K 15/03 29/598 |
| 5,944,499 | A | * | 8/1999 | Morita | F04C 2/22 418/8 |
| 5,949,164 | A | * | 9/1999 | Cap | H02K 3/50 310/90 |
| 5,962,939 | A | * | 10/1999 | Nakamura | H02K 11/33 123/149 D |
| 5,982,063 | A | * | 11/1999 | Lutz | H02K 7/1023 310/77 |
| 5,994,809 | A | * | 11/1999 | Ackermann | H02K 49/102 310/112 |
| 6,005,358 | A | * | 12/1999 | Radev | B60L 50/60 318/539 |
| 6,053,441 | A | * | 4/2000 | Danforth | D21B 1/347 241/46.11 |
| 6,069,467 | A | * | 5/2000 | Jansen | H02P 6/183 318/811 |
| 6,106,250 | A | * | 8/2000 | Morita | F04C 2/22 418/8 |
| 6,211,592 | B1 | * | 4/2001 | Ichiyama | F16C 33/107 310/90 |
| 6,459,185 | B1 | * | 10/2002 | Ehrhart | H02K 16/04 310/156.45 |
| 7,119,468 | B2 | * | 10/2006 | Shkondin | H02K 16/02 310/156.01 |
| 7,260,966 | B2 | * | 8/2007 | Shimoda | C22C 38/58 72/97 |
| 7,556,082 | B2 | * | 7/2009 | Welchko | H02K 15/03 164/95 |
| 8,106,609 | B2 | * | 1/2012 | Haussecker | H02K 23/04 310/68 B |
| 8,680,732 | B2 | * | 3/2014 | Kamei | H02K 1/2766 310/156.53 |
| 9,106,121 | B2 | * | 8/2015 | Kusase | H02K 21/14 |
| 9,311,442 | B2 | * | 4/2016 | Banerjee | G03F 1/36 |
| 10,020,698 | B2 | * | 7/2018 | Kondou | H02K 3/12 |
| 10,084,354 | B2 | * | 9/2018 | Baba | H02K 1/2766 |
| 10,186,360 | B2 | * | 1/2019 | Shimbo | H02K 15/03 |
| 10,700,560 | B2 | * | 6/2020 | Hisanabe | H02K 1/02 |
| 2002/0055722 | A1 | * | 5/2002 | Douglas | B29C 66/1224 604/272 |
| 2003/0025414 | A1 | * | 2/2003 | Kaneko | H02K 1/2786 310/156.38 |
| 2004/0017123 | A1 | * | 1/2004 | Miyashita | H02K 1/276 310/156.53 |
| 2005/0040721 | A1 | * | 2/2005 | Kusase | H02K 1/278 310/156.43 |
| 2005/0077802 | A1 | * | 4/2005 | Toujima | H02K 16/02 310/156.56 |
| 2006/0192454 | A1 | * | 8/2006 | Yamada | H02K 29/03 310/154.22 |
| 2006/0283225 | A1 | * | 12/2006 | Shimoda | C22C 38/02 72/97 |
| 2007/0096574 | A1 | * | 5/2007 | Romagny | B60K 6/448 310/112 |
| 2007/0096579 | A1 | * | 5/2007 | Aydin | H02K 1/2766 310/156.56 |
| 2008/0129135 | A1 | * | 6/2008 | Chen | H02K 16/04 310/254.1 |
| 2009/0021089 | A1 | * | 1/2009 | Nashiki | H02K 21/145 310/46 |
| 2009/0096314 | A1 | * | 4/2009 | Atarashi | H02K 16/02 310/156.53 |
| 2009/0224624 | A1 | * | 9/2009 | Kumar | H02K 1/246 310/156.53 |
| 2010/0007232 | A1 | * | 1/2010 | Komuro | H02K 1/02 310/156.01 |
| 2010/0139999 | A1 | * | 6/2010 | Park | H02K 7/102 310/114 |
| 2010/0213885 | A1 | * | 8/2010 | Ichiyama | H02K 21/12 310/156.46 |
| 2011/0193439 | A1 | * | 8/2011 | Yabe | H02K 1/276 310/156.38 |
| 2011/0285238 | A1 | * | 11/2011 | Kusase | H02K 16/04 310/156.48 |
| 2012/0091845 | A1 | * | 4/2012 | Takemoto | H02K 1/276 310/156.01 |
| 2012/0104892 | A1 | * | 5/2012 | Kamei | H02K 1/2766 310/156.53 |
| 2012/0194026 | A1 | * | 8/2012 | Matsuoka | H02K 1/2766 310/156.53 |
| 2012/0200184 | A1 | * | 8/2012 | Takeuchi | H02K 21/12 310/112 |
| 2012/0242182 | A1 | * | 9/2012 | Yabe | H02K 1/276 310/156.53 |
| 2013/0093275 | A1 | * | 4/2013 | Kim | H02K 16/00 310/114 |
| 2013/0169101 | A1 | * | 7/2013 | Deng | H02K 1/276 310/156.53 |
| 2013/0264895 | A1 | * | 10/2013 | Kondou | H02K 1/06 310/46 |
| 2013/0313938 | A1 | * | 11/2013 | Yamada | H02K 1/2706 310/156.69 |
| 2013/0342066 | A1 | * | 12/2013 | Taniguchi | H02K 1/28 310/156.28 |
| 2014/0158478 | A1 | * | 6/2014 | Macdonald | F16D 55/32 188/250 B |
| 2014/0159532 | A1 | * | 6/2014 | Kondou | H02K 1/27 310/156.53 |
| 2014/0167549 | A1 | * | 6/2014 | Huang | H02K 1/246 310/156.07 |
| 2014/0217859 | A1 | * | 8/2014 | Saito | H02K 1/276 310/68 D |
| 2015/0097642 | A1 | * | 4/2015 | Takagi | H01F 7/021 335/306 |
| 2015/0125337 | A1 | * | 5/2015 | Tsukada | C22C 38/002 425/78 |
| 2015/0288233 | A1 | * | 10/2015 | Kim | H02K 1/2766 310/156.01 |
| 2015/0303749 | A1 | * | 10/2015 | Okubo | H02K 21/14 310/156.38 |
| 2015/0310155 | A1 | * | 10/2015 | Banerjee | G03F 1/36 716/53 |
| 2015/0364959 | A1 | * | 12/2015 | Oketani | H02K 1/276 310/156.11 |
| 2016/0172912 | A1 | * | 6/2016 | Nigo | F04B 39/0005 417/415 |
| 2017/0110944 | A1 | | 4/2017 | Nigo et al. | |
| 2017/0162311 | A1 | * | 6/2017 | Shimbo | H02K 1/2706 |
| 2017/0338715 | A1 | * | 11/2017 | Li | H02K 9/02 |
| 2018/0083499 | A1 | * | 3/2018 | Hisanabe | H02K 1/02 |
| 2018/0268976 | A1 | * | 9/2018 | Yasumura | H01F 41/0253 |
| 2018/0287441 | A1 | | 10/2018 | Kitaoka et al. | |
| 2019/0149000 | A1 | * | 5/2019 | Hosoda | H02K 21/16 310/156.07 |
| 2020/0021152 | A1 | * | 1/2020 | Xu | H02K 1/28 |
| 2020/0091806 | A1 | * | 3/2020 | Shin | H02K 29/03 |

(56) References Cited

U.S. PATENT DOCUMENTS

2021/0006110 A1* 1/2021 Dong .................... H02K 1/2766
2021/0044167 A1* 2/2021 Huang ................... H02K 21/12
2021/0104942 A1* 4/2021 Katsuta ................ B60K 7/0007

FOREIGN PATENT DOCUMENTS

| JP | 2018-170940 A | | 11/2018 | |
|---|---|---|---|---|
| JP | 2002044889 | * | 4/2022 | ............. H02K 16/04 |

* cited by examiner

ROTATING ELECTRICAL MACHINE WITH ROTOR HAVING ARC SHAPED PERMANENT MAGNETS

CROSS-REFERENCE TO RELATED APPLICATIONS

This application is based upon and claims the benefit of priority from Japanese Patent Application No. 2018-234578, filed on 14 Dec. 2018, the entire contents of which are incorporated herein by reference.

TECHNICAL FIELD

The present disclosure relates to a permanent magnet and a rotating electrical machine.

BACKGROUND

In the related art, as a rotating electrical machine, there has been known an IPM motor which is one type of inner rotor motor and in which a permanent magnet is embedded in a rotor (for example, Japanese Unexamined Patent Publication No. 2018-170940).

As the permanent magnet embedded in the rotor of the IPM motor, the inventors have been researching a permanent magnet having an arc shape cross-section, which more easily realizes a desired magnetic distribution than a rectangular parallelepiped permanent magnet, rather than the rectangular parallelepiped permanent magnet which has been adopted in the related art. If the permanent magnet having an arc shape cross-section has a planar reference surface in a surface thereof, positioning is facilitated when surface processing or the like is performed thereon. On the other hand, it is generally considered that it is difficult to form the reference surface with a high dimensional accuracy in a magnet surface, and if variations occur in the dimensions of the reference surface, variations occur also in rotor characteristics.

SUMMARY

After extensive research, the inventors have newly found a technique that is capable of easily forming the reference surface while preventing variations in rotor characteristics.

According to the present disclosure, there is provided a permanent magnet and a rotating electrical machine in which it is possible to easily form a reference surface while preventing variations in the characteristics of the rotating electrical machine.

A permanent magnet according to an aspect of the present disclosure has an arc shape cross-section defined by an outer arc, an inner arc, and a pair of end sides connecting an end point of the outer arc and an end point of the inner arc, and has a perpendicular reference surface provided in an inner peripheral surface defined by the inner arc and perpendicular to a direction of a bisector of an opening angle of the inner arc in the cross section.

The inventors have obtained the knowledge that even though there is a difference in the dimension of the perpendicular reference surface provided in the inner peripheral surface of the permanent magnet, almost no variations occur in the characteristics of a rotating electrical machine. That is, even though variations occur in the dimension of the perpendicular reference surface, variations in the characteristics of the rotating electrical machine are prevented. Therefore, according to the permanent magnet described above, it is possible to easily form a reference surface while preventing variations in the characteristics of the rotating electrical machine.

The permanent magnet according to another aspect is radially magnetized with reference to a virtual center positioned close to the inner arc in the cross section.

In the permanent magnet according to another aspect, a range of an opening angle θ of the inner arc is 10°≤θ≤90°.

According to an aspect of the present disclosure, there is provided a rotating electrical machine that includes a rotor having a shaft and a rotor core, a plurality of permanent magnets are attached to the rotor core to surround the shaft, and a stator disposed on an outer periphery of the rotor and having a plurality of coils, in which the permanent magnet has an arc shape cross-section defined by an outer arc, an inner arc, and a pair of end sides connecting an end point of the outer arc and an end point of the inner arc, and includes a perpendicular reference surface provided in an inner peripheral surface defined by the inner arc and perpendicular to a direction of a bisector of an opening angle of the inner arc in the cross section.

The inventors have obtained the knowledge that even though there is a difference in the dimension of the perpendicular reference surface provided in the inner peripheral surface of the permanent magnet, almost no variations occur in the characteristics of a rotating electrical machine. That is, even though variations occur in the dimension of the perpendicular reference surface, variations in the characteristics of the rotating electrical machine are prevented. Therefore, it is possible to easily form a reference surface of the permanent magnet while preventing variations in the characteristics of the rotating electrical machine.

DETAILED DESCRIPTION

Figure 1:
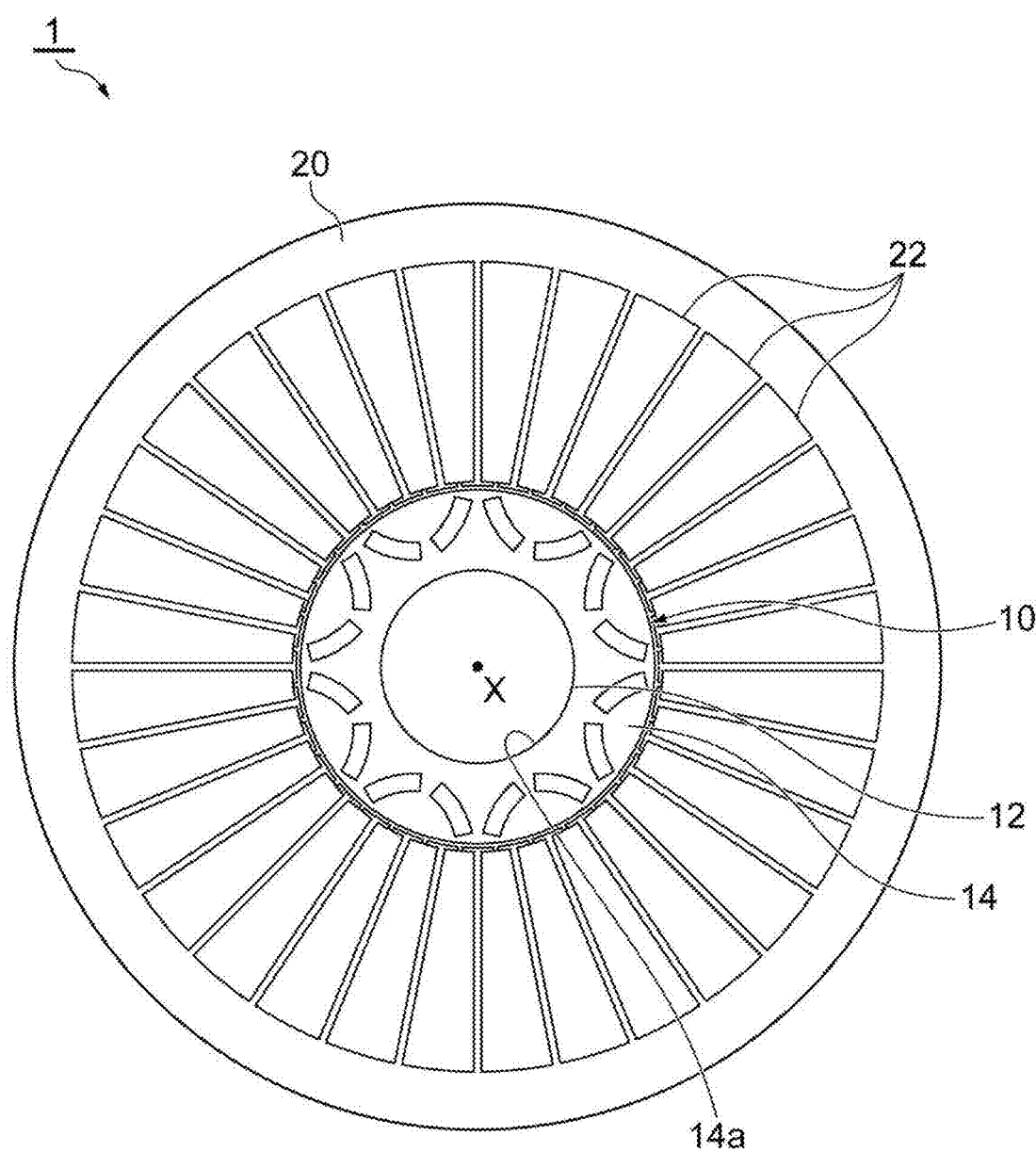
FIG. 1 is a schematic cross-sectional view illustrating an IPM motor according to one embodiment of the present disclosure.

Hereinafter, various embodiments and examples will be described with reference to the drawings. Incidentally, in the drawings, the same reference signs will be assigned to the same or equivalent parts, and duplicated descriptions will be omitted.

In embodiments illustrated hereinafter, a motor (more specifically, IPM motor) will be described as an example of a rotating electrical machine. FIG. 1 illustrates an IPM motor 1 according to an embodiment. FIG. 1 illustrates a cross section of the IPM motor 1, which is orthogonal to a rotation axis X. The IPM motor 1 is an inner rotor motor which has a rotor 10 and a stator 20 and in which the rotor 10 is positioned inside the stator 20. In the present embodiment, the IPM motor 1 has a configuration of 8 poles and 32 slots.

The rotor 10 is configured to include a shaft 12 and a rotor core 14.

The shaft 12 has a columnar shape and extends in a direction perpendicular to the sheet of FIG. 1. The shaft 12 is formed of, for example, stainless steel or the like.

The rotor core 14 has a cylindrical shape and has a shaft hole 14a thereinside. The shaft 12 is fitted into the shaft hole 14a of the rotor core 14. The rotor core 14 and the shaft 12 rotate integrally around the rotation axis X. The rotor core 14 is formed of, for example, laminated steel sheets. In the present embodiment, the rotor core 14 has an outer diameter of 76 mm and an inner diameter of 41.2 mm.

Figure 2:
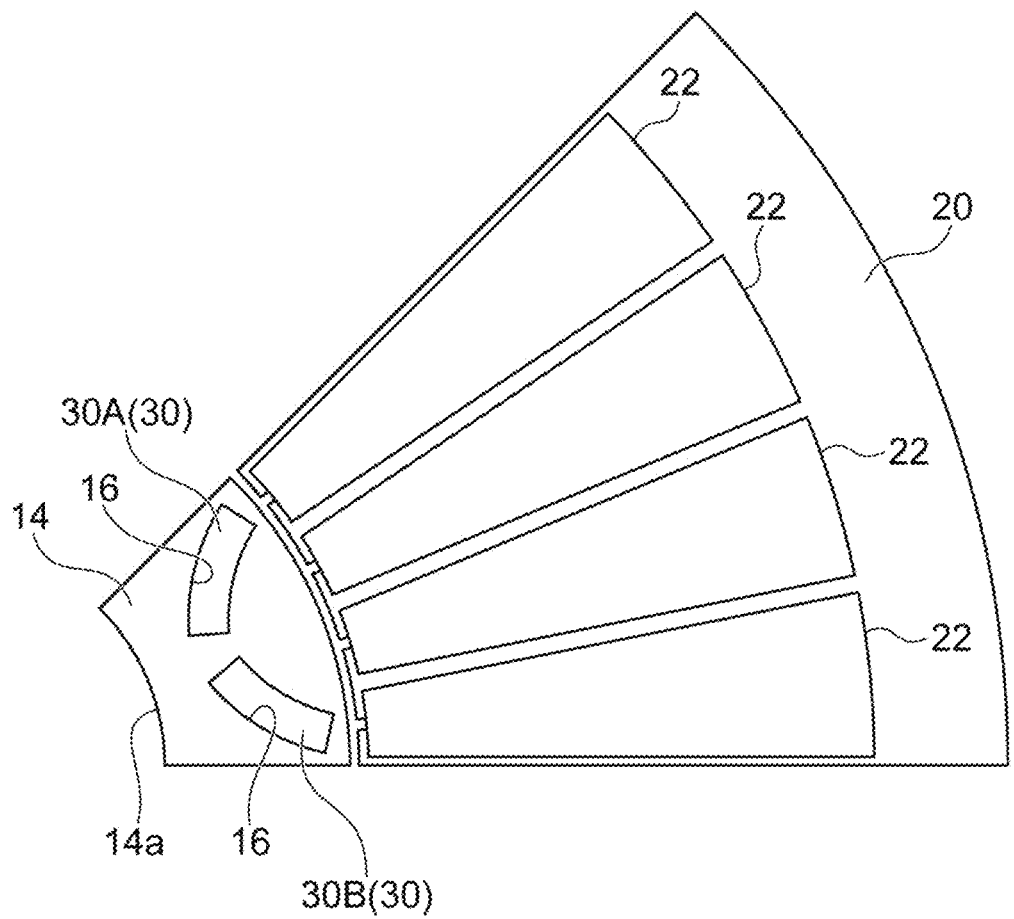
FIG. 2 is a main part enlarged view of the IPM motor illustrated in FIG. 1.
Figure 3:
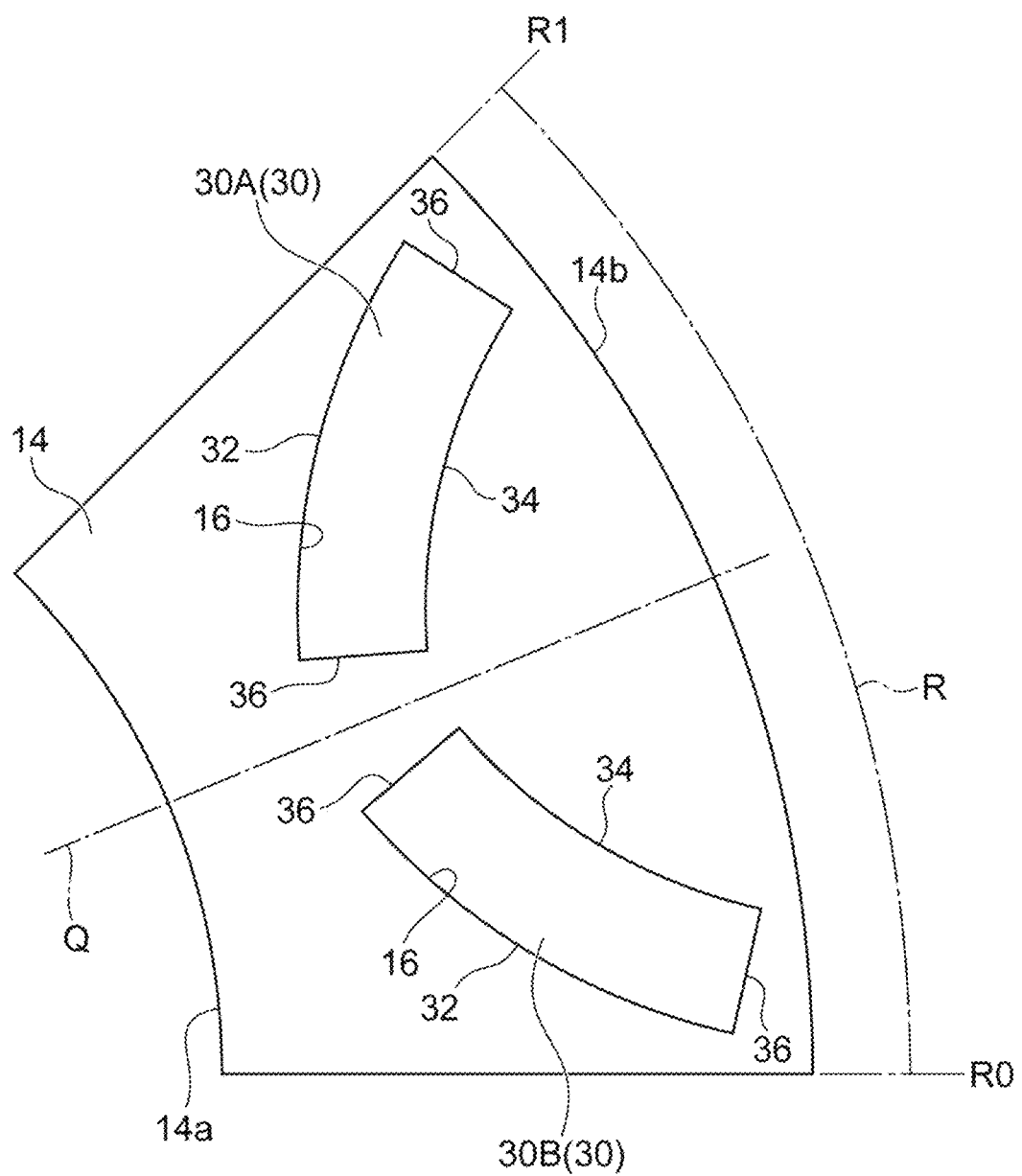
FIG. 3 is a view illustrating a rotor illustrated in FIG. 2.
Figure 4:
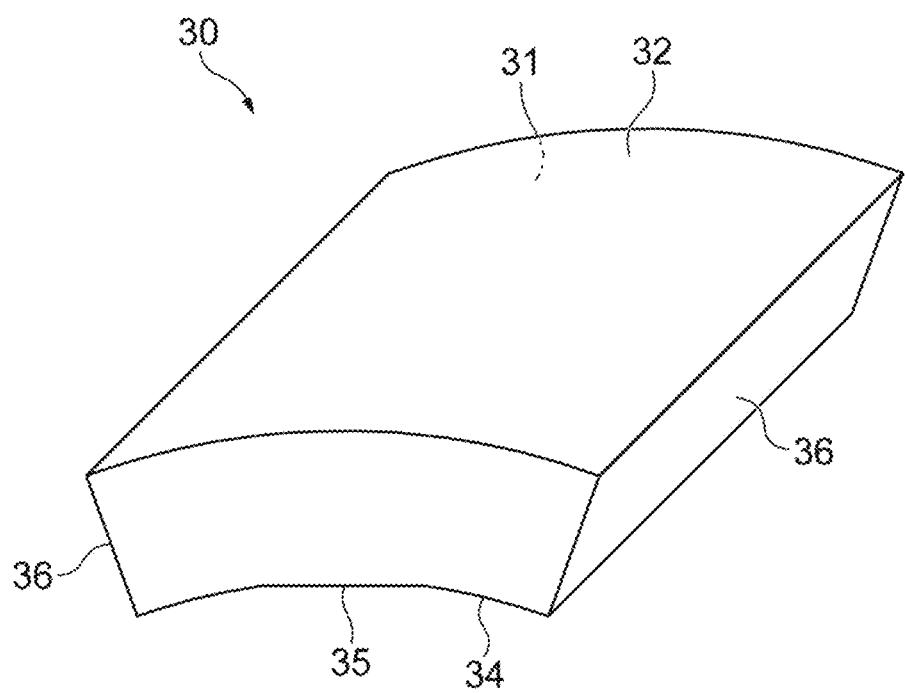
FIG. 4 is a schematic perspective view of a permanent magnet illustrated in FIG. 3.

As illustrated in FIGS. 2 to 4, the rotor core 14 has a plurality of permanent magnets 30. The plurality of permanent magnets 30 may be permanent magnets formed of the same material. In the present embodiment, each of the permanent magnet 30 is formed of a rare earth based permanent magnet, for example, may be an R-T-B based permanent magnet. In addition, among the R-T-B based permanent magnets, the permanent magnet 30 may be an R-T-B based sintered magnet. The R-T-B based sintered magnet has grains (crystal grains) consisting of $R_2T_{14}B$ crystals, and grain boundaries. Each of the permanent magnets 30 is not limited to the sintered magnet, and may be a bonded magnet or a hot worked magnet.

R in the R-T-B based sintered magnet is at least one of rare earth elements. The rare earth elements are Sc, Y, and lanthanoid elements belonging to Group 3 in the long-period periodic table. The lanthanoid elements include, for example, La, Ce, Pr, Nd, Sm, Eu, Gd, Tb, Dy, Ho, Er, Tm, Yb, Lu, and the like. T in the R-T-B based sintered magnet is Fe, or Fe and Co. Furthermore, T may include one or more selected from other transition metal elements. B in the R-T-B based sintered magnet is boron (B), or boron (B) and carbon (C).

The R-T-B based sintered magnet according to the present embodiment may include Cu, Al, or the like. It is possible to attain a high coercive force or a high corrosion resistance, or to improve the temperature characteristics of magnetic properties by adding these elements.

Furthermore, the R-T-B based sintered magnet according to the present embodiment may include Dy, Tb, or both as a heavy rare earth element. The heavy rare earth element may be included in the crystal grains and the grain boundaries. If the heavy rare earth element is not substantially included in the crystal grains, the heavy rare earth element may be included in the grain boundaries. The concentration of the heavy rare earth element at the grain boundaries may be higher than the concentration thereof in the crystal grains. The R-T-B based sintered magnet according to the present embodiment may be an R-T-B based sintered magnet in which the heavy rare earth element is diffused along grain boundaries. It is possible to further improve the residual magnetic flux density and the coercive force of the R-T-B based sintered magnet in which the heavy rare earth element is diffused along the grain boundaries, with a smaller amount of the heavy rear earth elements, compared to those of an R-T-B based sintered magnet in which the heavy rare earth element is not diffused along grain boundaries. Incidentally, if the R-T-B based sintered magnet in which the heavy rare earth element is diffused along the grain boundaries is used as the permanent magnet 30 according to the present embodiment, it is possible to use a magnet in which the heavy rare earth element is in its entirety diffused along grain boundaries rather than a magnet in which the heavy rare earth element is partly diffused along grain boundaries. Since the permanent magnet has the above-mentioned configuration, the productivity improves and the cost decreases.

In addition, if the permanent magnet 30 according to the present embodiment is an R-T-B based permanent magnet, the R-T-B based permanent magnet is not limited to the R-T-B based sintered magnet that is produced by sintering as described above. For example, an R-T-B based permanent magnet which is produced by hot forming and hot working instead of sintering may be used.

If hot forming is performed such that a cold formed body, which is obtained by forming raw material powder at a room temperature, is pressurized while being heated, it is possible to eliminate air pores remaining in the cold formed body and densifying the cold formed boy without performing sintering. Furthermore, it is possible to obtain an R-T-B based permanent magnet having a desired shape and having magnetic anisotropy by performing hot extrusion as hot working on a formed body that is obtained by hot forming.

Each of the permanent magnets 30 is accommodated in a magnet hole 16 extending parallel to the rotation axis X of the rotor 10. The inner dimensions of the magnet hole 16 are designed slightly larger than the external dimensions of the permanent magnet 30 which will be described later. For this reason, the position or the posture of the permanent magnet 30 is not changed in the magnet hole 16.

The stator 20 is a cylindrical member that is provided to surround an outer periphery of the rotor 10. A plurality (32 pieces in the present embodiment) of coils 22 are arranged on an inner peripheral side of the stator 20. The plurality of coils 22 are arranged at equal angular intervals with respect to the rotation axis X of the rotor 10. If an alternating voltage is applied from an inverter circuit (not illustrated) or the like to the plurality of coils 22, a rotating magnetic field is formed on the inner peripheral side of the stator 20. In the present embodiment, the stator 20 has an outer diameter of 200 mm and an inner diameter of 78 mm.

In the present embodiment, the rotor 10 includes eight pairs of the permanent magnets 30 having the same shape. The eight pairs of the permanent magnets 30 are pairs of the permanent magnets 30 that are arranged at equal angular intervals with respect to the rotation axis X. As illustrated in FIG. 3, when seen from the direction of the rotation axis X, each pair of the permanent magnets 30 are line-symmetrically arranged with respect to a virtual line Q passing through the rotation axis X of the rotor 10. Specifically, the permanent magnets 30 forming a pair are arranged in an inclined manner so as to form a substantially U shape (or a substantially V shape), and are slightly separate (for example, 5 mm) from each other in a direction orthogonal to the virtual line Q. In addition, both of the permanent magnets 30 forming a pair have an end surface shape and a cross-sectional shape which are arch shapes when seen from the direction of the rotation axis X. Inner arc sides of the permanent magnets 30 are arranged so as to face an outer peripheral surface 14b of the rotor core 14. In the present embodiment, bisectors L (which will be described later) of the permanent magnets 30 forming a pair intersect each other at an angle of 74°. In addition, in the present embodiment, the permanent magnet 30 is not exposed to the outer peripheral surface 14b of the rotor core 14, and is positioned slightly inside (for example, 2.2 mm) from the outer peripheral surface 14b. Furthermore, in the present embodiment, four coils 22 of the stator 20 correspond to a pair of the permanent magnets 30 of the rotor core 14.

Consecutively, the shape of the permanent magnet 30 will be described with reference to FIGS. 4 and 5.

As illustrated in FIG. 4, the permanent magnet 30 has a long shape extending in one direction. The permanent magnet 30 is arranged in the magnet hole 16 of the rotor core 14 such that the extending direction is parallel to the rotation axis X of the rotor 10. The length of the permanent magnet 30 in the extending direction is 20 mm as an example.

Figure 5:
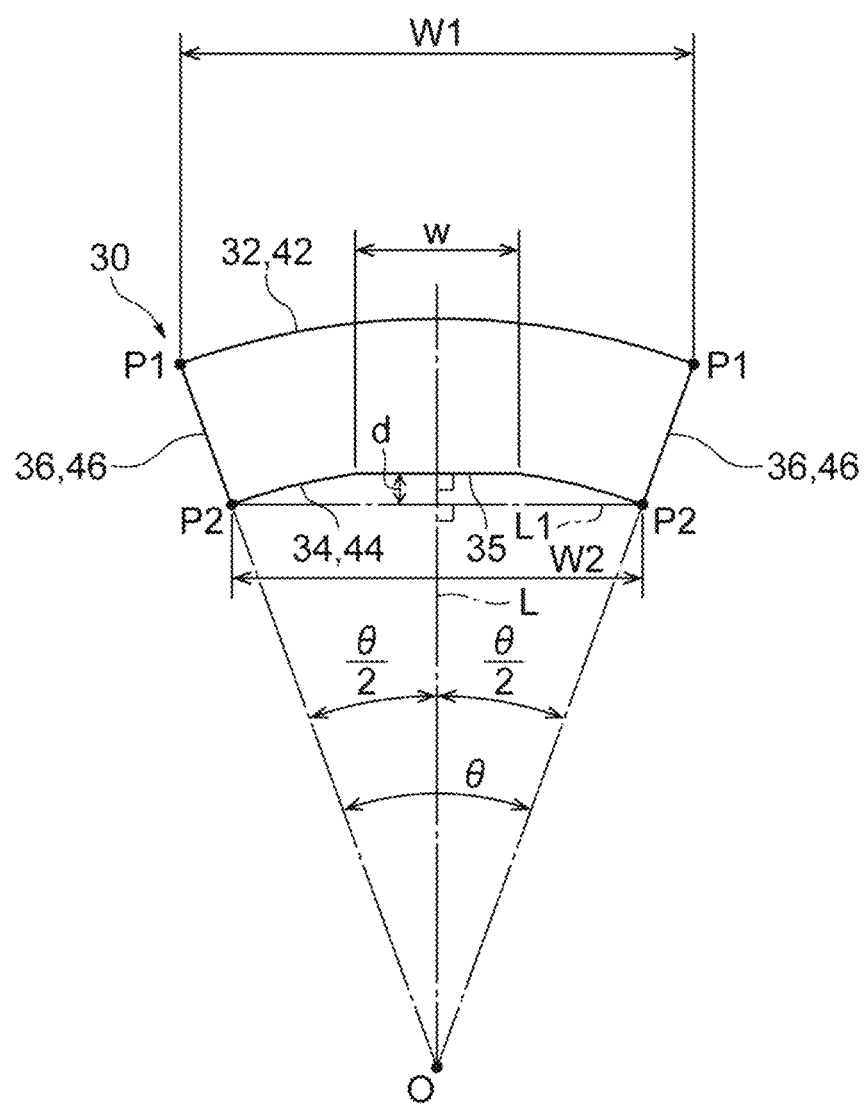
FIG. 5 is a schematic cross-sectional view of the permanent magnet illustrated in FIG. 4.

As illustrated in FIG. 5, the shapes of a cross section and an end surface of the permanent magnet 30 which are orthogonal to the extending direction are arch shapes. More specifically, the permanent magnet 30 has an arc shape cross-section that is defined by an outer arc 42, an inner arc 44, and a pair of end sides 46, each of which connects an end point P1 of the outer arc 42 to an end point P2 of the inner arc 44. In the present embodiment, a center O of curvature of the outer arc 42 coincides with the center O of curvature of the inner arc 44. However, a slight offset between the center of curvature of the outer arc 42 and the center of curvature of the inner arc 44 can be allowed as long as not causing a problem in practical use. The cross-sectional shape of the permanent magnet 30 can be described as being a fan shape, an arc shape, a bow shape, a C shape, or a U shape other than an arch shape.

An exterior surface of the permanent magnet 30 is formed of a pair of end surfaces 31 facing each other in the extending direction; an outer peripheral surface 32 defined by the outer arc 42; an inner peripheral surface 34 defined by the inner arc 44; and side surfaces 36 defined by the end sides 46.

In a cross-sectional shape of the permanent magnet 30 illustrated in FIG. 5, an opening angle (central angle) θ of the inner arc 44 is selected in a range of 10°≤θ≤90°. In the present embodiment, the opening angle θ of the inner arc 44 is 40°. In addition, in the present embodiment, in the permanent magnet 30, the diameter (outer diameter) of the outer arc 42 is 37.5 mm, and the diameter (inner diameter) of the inner arc 44 is 30 mm. A width dimension W1 of the permanent magnet 30 is the length of the permanent magnet 30 in a direction orthogonal to the direction of the bisector L. The width dimension W1 is equal to a separation distance between both end points P1 of the outer arc 42, and is 25.65 mm as an example.

The permanent magnet 30 has a perpendicular reference surface 35 in the inner peripheral surface 34. The perpendicular reference surface 35 is a surface that is perpendicular to the direction of the bisector L of the opening angle θ of the inner arc 44. The perpendicular reference surface 35 intersects the bisector L, and has symmetry with respect to the bisector L. A length (hereinafter, referred to as a reference surface length) w of the perpendicular reference surface 35 in the direction orthogonal to the direction of the bisector L is 8.2 mm as an example. The reference surface length w of the perpendicular reference surface 35 depends on a separation distance d between a reference line L1, which passes through the end points P2 of the inner arc 44 and is perpendicular to the bisector L, and the perpendicular reference surface 35. The shorter the separation distance d becomes, the longer the reference surface length w becomes. A separation distance W2 between both end points P2 of the inner arc 44 is 20.5 mm as an example.

The permanent magnet 30 is magnetized in a radial direction thereof. In the present embodiment, the center O of curvature of the outer arc 42 and the inner arc 44 is a virtual center, and the permanent magnet 30 is radially magnetized with reference to the virtual center. The virtual center may be positioned close to the inner arc 44 in the cross section, and may not necessarily be the center O of curvature. The permanent magnet 30 may be magnetized before the permanent magnet 30 is assembled into the rotor core 14, or may be magnetized in a state where the permanent magnet 30 is assembled into the rotor core 14. If the magnetization is performed as described above, magnetic pole surfaces are formed in the outer peripheral surface 32 and the inner peripheral surface 34 of the permanent magnet 30.

In the permanent magnet 30 described above, the dimension of the perpendicular reference surface 35 changes in response to the separation distance d between the reference line L1 and the perpendicular reference surface 35. The cross-sectional area and the magnet volume of the permanent magnet 30 change with a dimensional change of the perpendicular reference surface 35.

The inventors have confirmed, by simulations illustrated hereinafter, that even though there is a difference in the dimension of the perpendicular reference surface 35 of the permanent magnet 30, the characteristics of the IPM motor are not affected.

Hereinafter, set conditions and results of the simulations performed by the inventors will be described with reference to FIGS. 6 to 9.

In the simulations, a magnetic flux density (surface magnetic flux density) in the outer peripheral surface 14b of the rotor core 14 of a pair of the permanent magnets 30 illustrated in FIG. 3 from an angular position R0 to an angular position R1 along a reference line R aligned along the outer peripheral surface 14b of the rotor core 14 was obtained by using a finite element method. The angular position R0 and the angular position R1 are angular positions with respect to the rotation axis X. The angular position R0 and the angular position R1 are offset 45° from each other.

Figure 6:
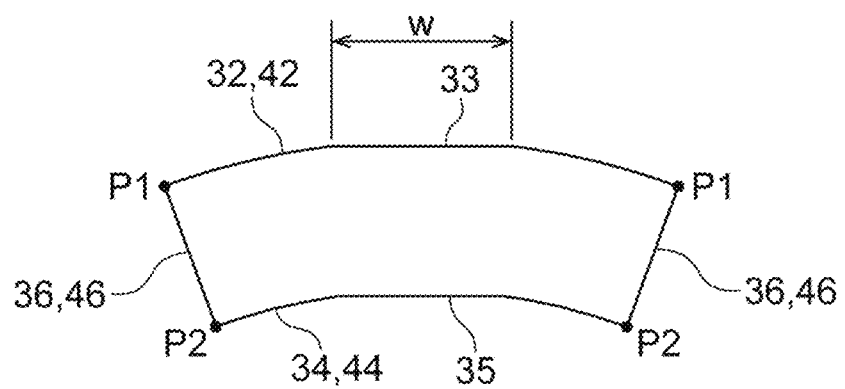
FIG. 6 is a schematic cross-sectional view illustrating the shape of a permanent magnet used in a simulation.
Figure 7:
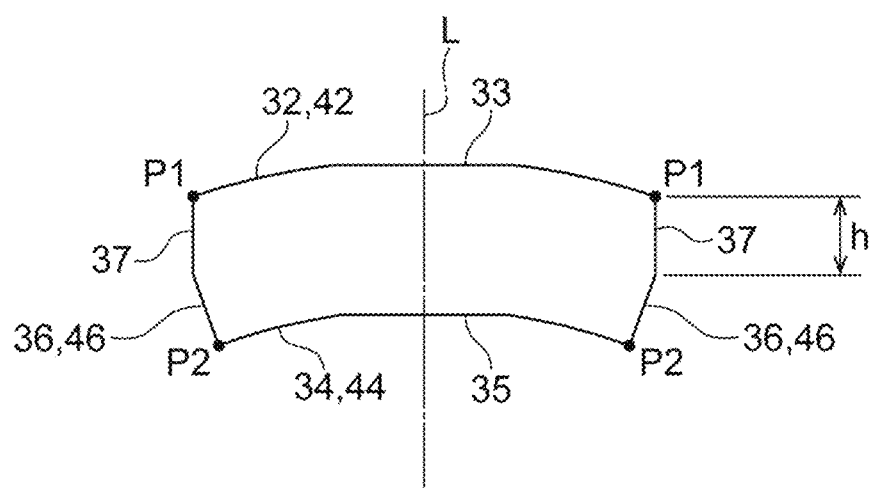
FIG. 7 is a schematic cross-sectional view illustrating the shape of a permanent magnet used in a simulation.

In the present simulation, a sample 1 having the shape of the permanent magnet 30, a sample 2 having the shape illustrated in FIG. 6, and a sample 3 having the shape illustrated in FIG. 7 were used.

A permanent magnet illustrated in FIG. 6 differs from the permanent magnet 30 only in that the permanent magnet has a perpendicular reference surface 33 in the outer peripheral surface 32. The perpendicular reference surface 33 is a surface that is perpendicular to the direction of the bisector L of the opening angle θ of the inner arc 44, and is a surface parallel to the perpendicular reference surface 35. The perpendicular reference surface 33 intersects the bisector L, and has symmetry with respect to the bisector L. The perpendicular reference surface 33 is positioned closer to the outside (that is, on a side separate from the inner arc 44) than the end point P1 of the outer arc 42. The length w of the perpendicular reference surface 33 in the direction orthogonal to the direction of the bisector L is 9 mm as an example.

A permanent magnet illustrated in FIG. 7 differs from the permanent magnet 30 only in that the permanent magnet has the perpendicular reference surface 33 in the outer peripheral surface 32 and has a parallel reference surface 37 in each of the side surfaces 36. The parallel reference surface 37 is a surface that is parallel to the direction of the bisector L of the opening angle θ of the inner arc 44. The parallel reference surface 37 is positioned closer to the outside (that is, on a side separate from the bisector L) than the end point P2 of the inner arc 44. A length h of the parallel reference surface 37 in the direction of the bisector L is 3.96 mm as an example.

In addition, for comparison, in the present simulation, a sample 0 which does not have the parallel reference surface 37 or the perpendicular reference surface 33 was used.

Figure 8:
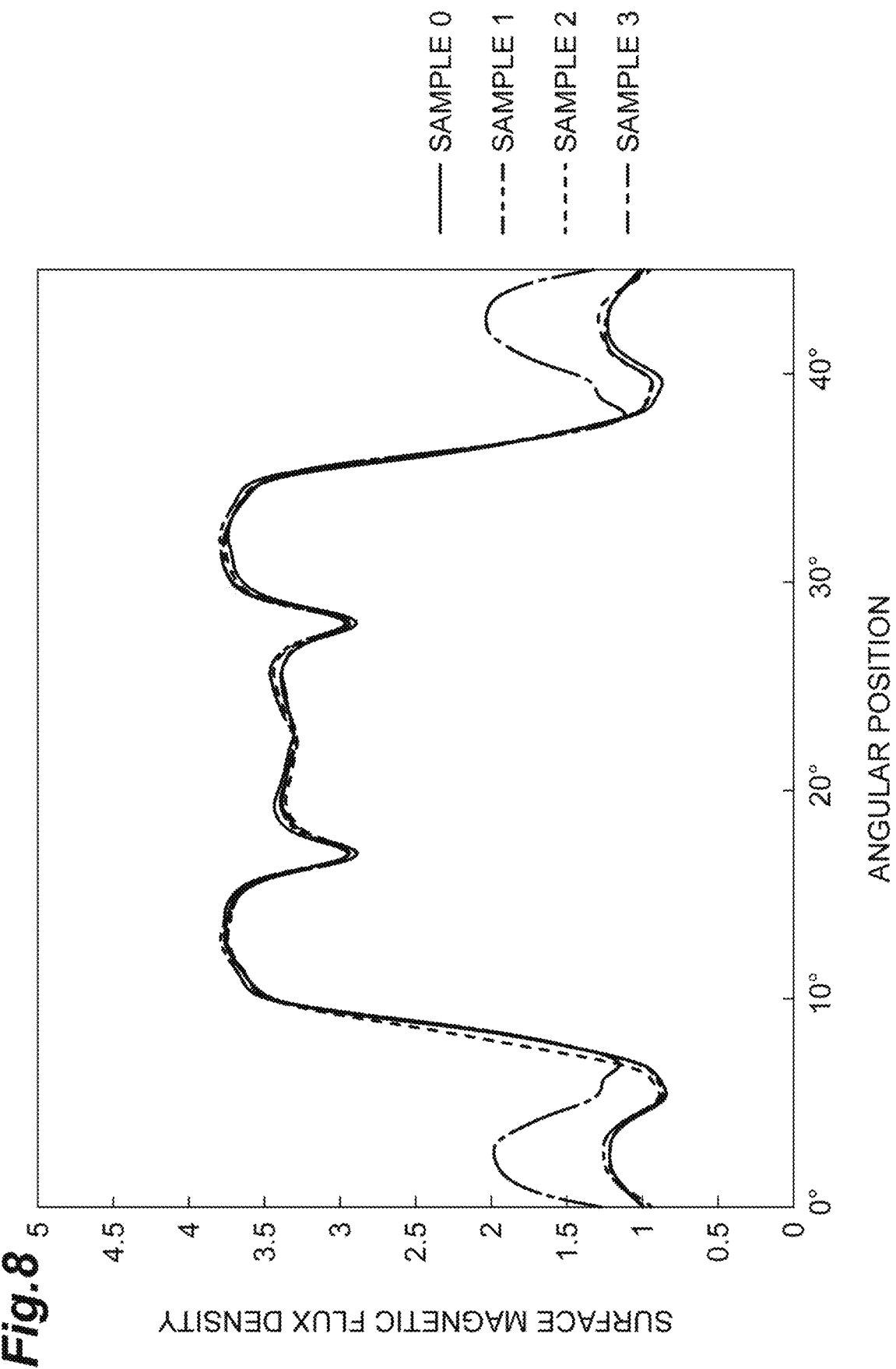
FIG. 8 is a graph showing relationships between the angular positions and the surface magnetic flux densities of permanent magnets.

A result of the simulation is as shown in the graph of FIG. 8. In the graph of FIG. 8, the horizontal axis is a relative angular position with reference to the angular position R0, and the vertical axis is the ratio of the surface magnetic flux density of each sample to the surface magnetic flux density of the sample 0.

From the graph of FIG. 8, it could be confirmed that any of the surface magnetic flux densities of the samples 1 to 3 is not significantly different from the surface magnetic flux density of the sample 0.

Figure 9:
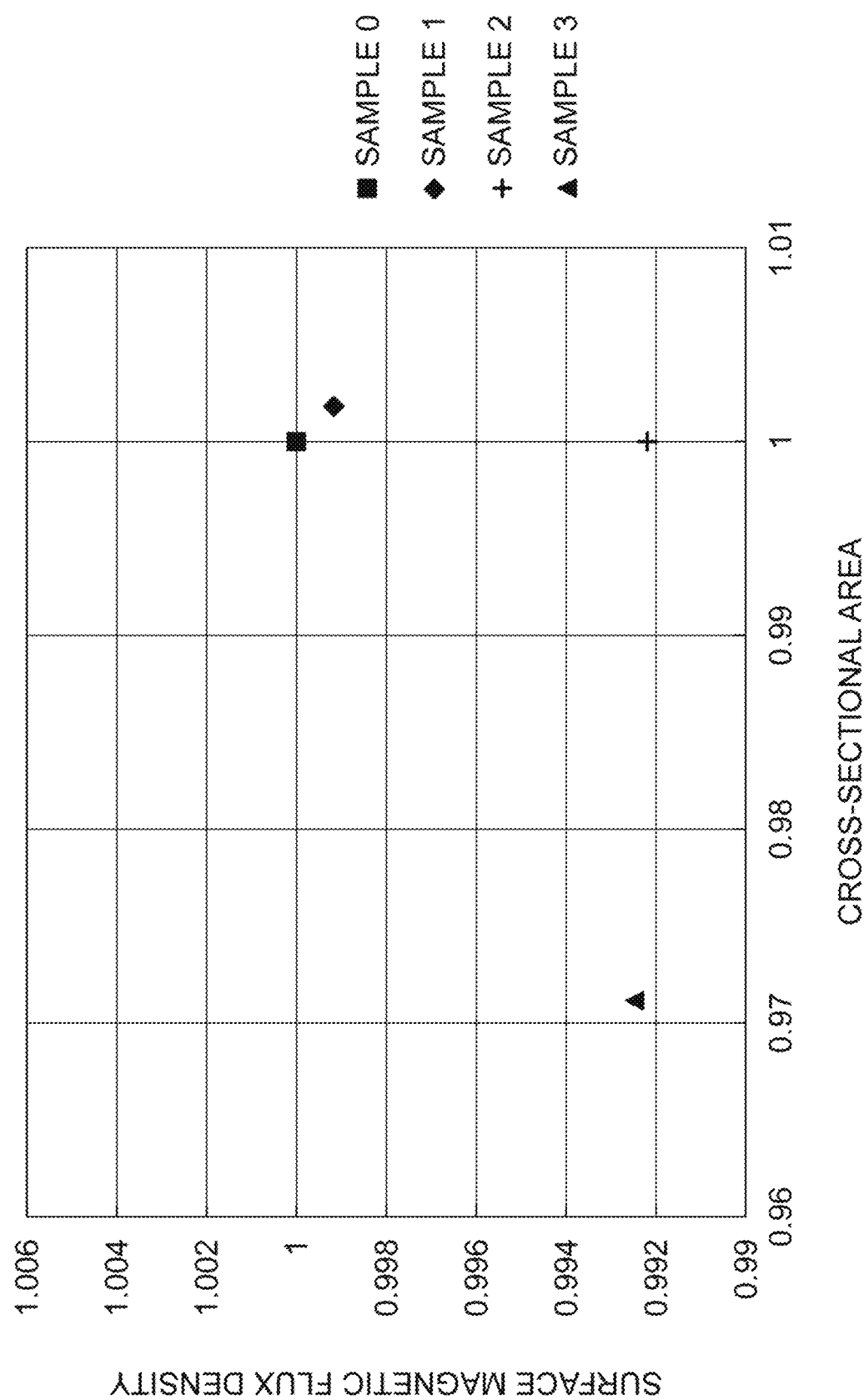
FIG. 9 is a graph showing relationships between the cross-sectional areas and the surface magnetic flux densities of the permanent magnets.

The graph of FIG. 9 is a graph showing the surface magnetic flux density of each sample at predetermined angular positions. The graph of FIG. 9 shows the surface magnetic flux density of each sample at a relative angular position of 22.5° (that is, an intermediate position between the angular position R0 and the angular position R1) with reference to the angular position R0. In the graph of FIG. 9, the horizontal axis is the ratio of the cross-sectional area of each sample to the cross-sectional area of the sample 0, and the vertical axis is the ratio of the surface magnetic flux density of each sample to the surface magnetic flux density of the sample 0.

From the graph of FIG. 9, it has been confirmed that the cross-sectional area of the sample 1 is larger than the cross-sectional area of the sample 0, but the surface magnetic flux density of the sample 1 is equal to the surface magnetic flux density of the sample 0. It has been confirmed that the degree of decrease in the surface magnetic flux density of the samples 2 and 3 with respect to that of the sample 0 is larger compared to that in the surface magnetic flux density of the sample 1.

From the simulation results described above, it has been confirmed that any of the surface magnetic flux densities of the samples 1 to 3 having a shape having the perpendicular reference surface 35 is equal to the surface magnetic flux density of the sample 0 having a shape that does not have the parallel reference surface 37 or the perpendicular reference surface 33. In particular, it has been confirmed that the surface magnetic flux density of the sample 1 having the shape having only the perpendicular reference surface 35 is very close to the surface magnetic flux density of the sample 0.

Figure 10:
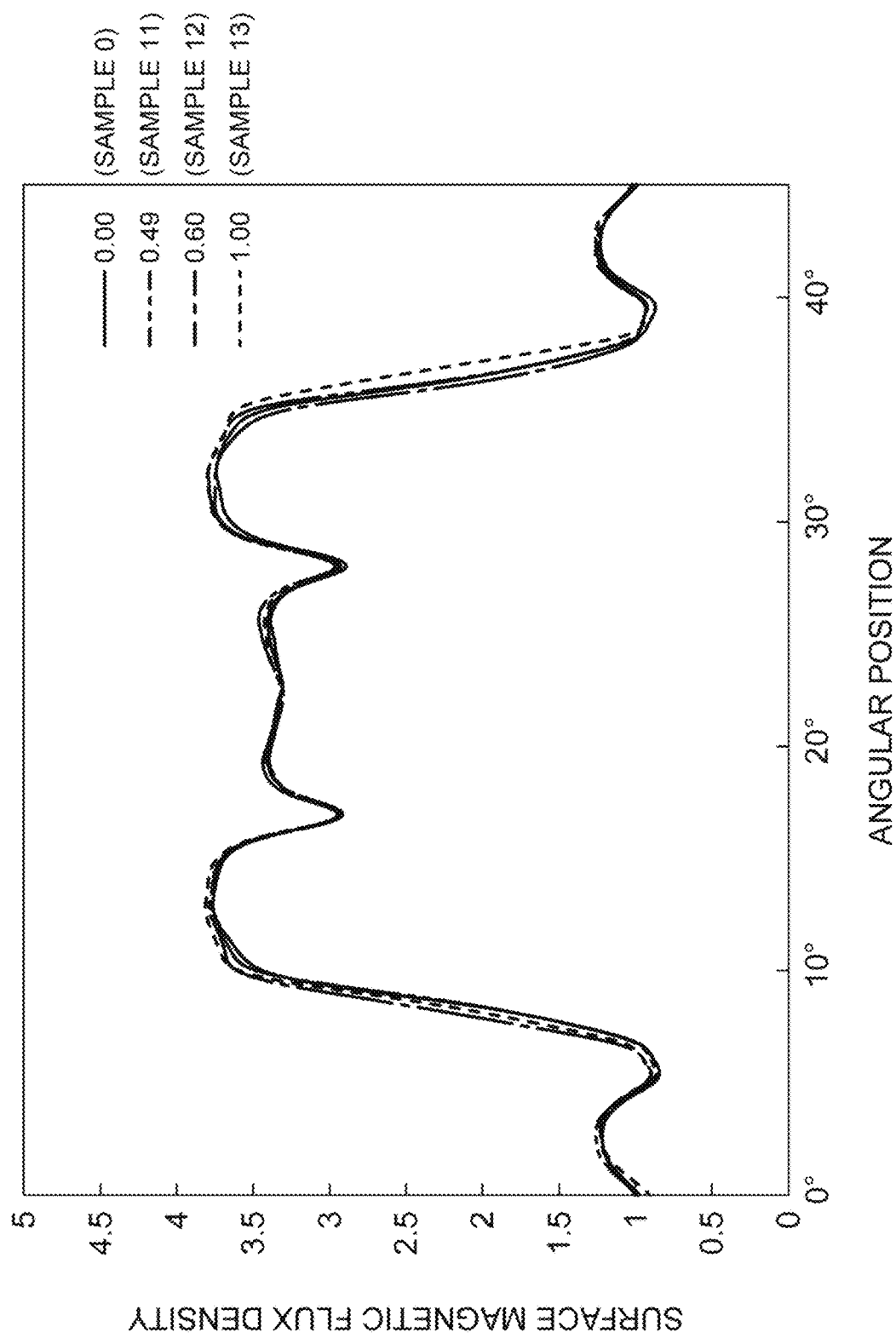
FIG. 10 is a graph showing relationships between the angular positions and the surface magnetic flux densities of permanent magnets having the form illustrated in FIG. 4.

In addition, in order to confirm the relationship between the reference surface length w of the perpendicular reference surface 35 and the surface magnetic flux density, the inventors measured the surface magnetic flux densities of a plurality of the samples 1, between which the ratio (w/W2) of the reference surface length w of the perpendicular reference surface 35 to the separation distance W2 between both end points P2 of the inner arc 44 differed, in the same set conditions as those described above. A result of the measurement is as shown in the graph of FIG. 10. In the graph of FIG. 10, the horizontal axis is a relative angular position with reference to the angular position R0, and the vertical axis is the ratio of the surface magnetic flux density of each sample to the surface magnetic flux density of the sample 0.

In the present simulation, samples 11 to 13, in which the ratios (w/W2) of the reference surface length w of the perpendicular reference surface 35 are 0.49, 0.60, and 1.00, were used. In addition, for comparison, a sample (that is, the sample 0 having a shape that does not have the perpendicular reference surface 35), in which the ratio (w/W2) of the reference surface length w of the perpendicular reference surface 35 is 0, was used.

As being obvious from the graph of FIG. 10, the surface magnetic flux densities of the samples 11 to 13 are not significantly different from the surface magnetic flux density of the sample 0. In particular, at angular positions 10 to 35° where the magnetic flux of each of a pair of permanent magnets concentrates, the surface magnetic flux densities of the samples 11 to 13 are substantially the same as the surface magnetic flux density of the sample 0.

Figure 11:
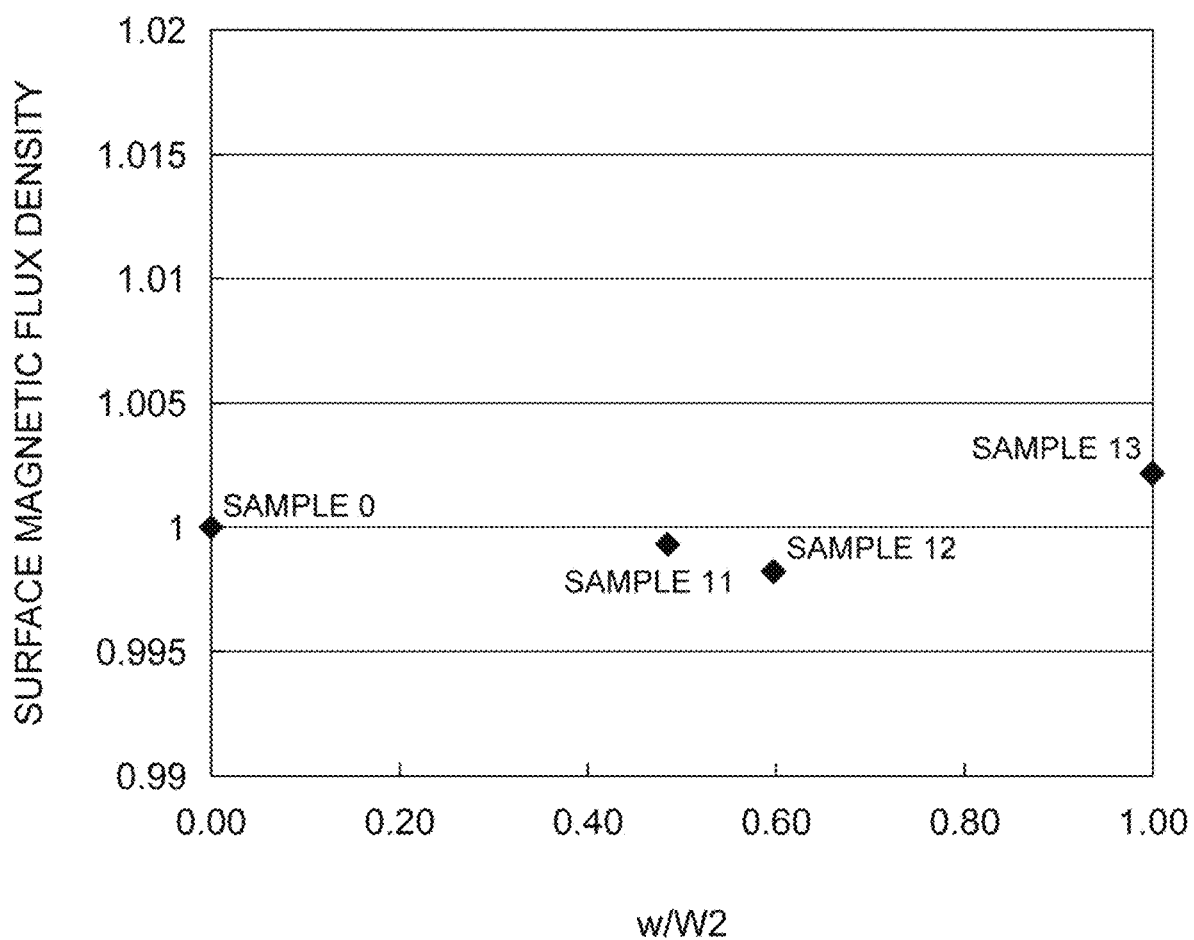
FIG. 11 is a graph showing relationships between the reference surface lengths and the surface magnetic flux densities of the permanent magnets having the form illustrated in FIG. 4.
Figure 12:
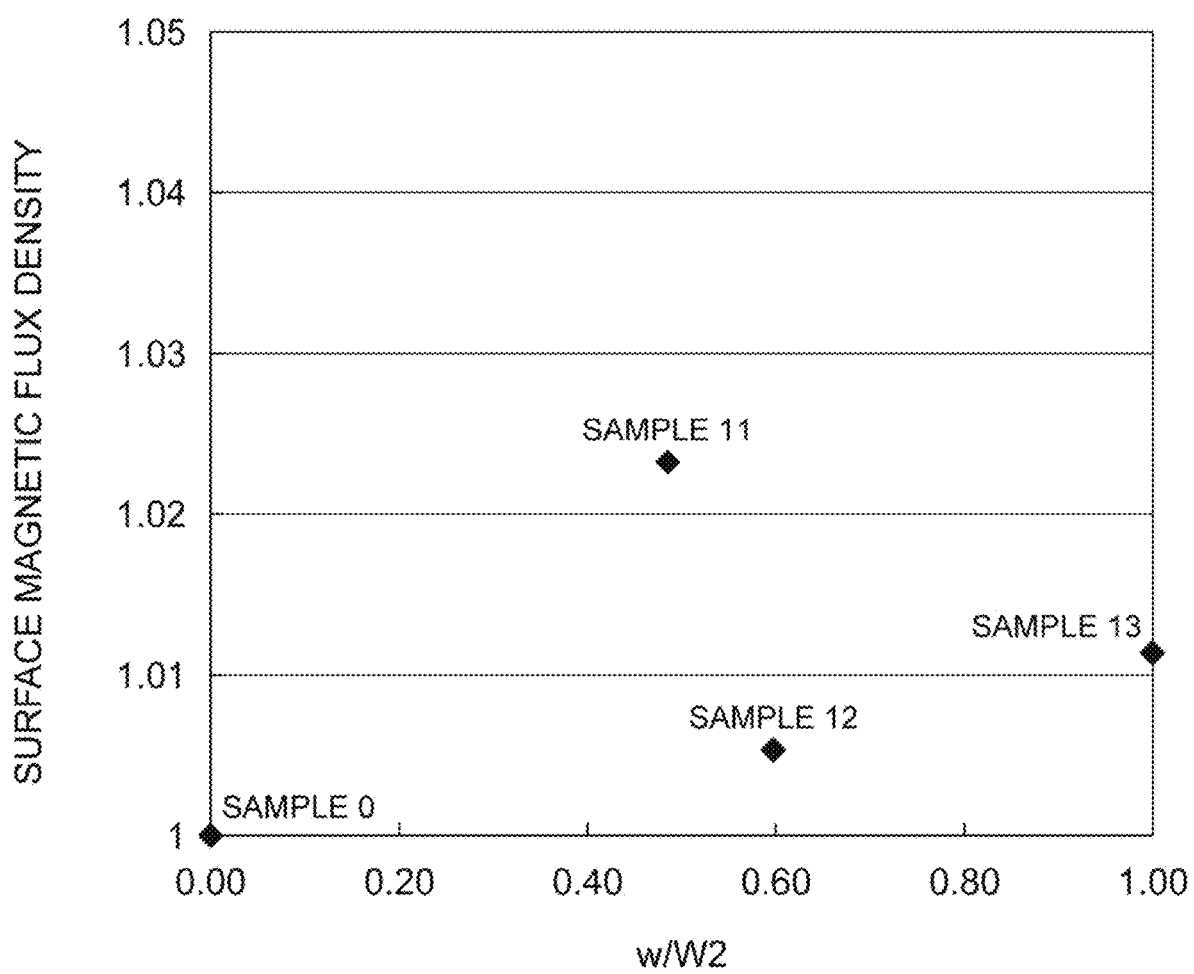
FIG. 12 is a graph showing relationships between the reference surface lengths and the surface magnetic flux densities of the permanent magnets having the form illustrated in FIG. 4.

The graphs of FIGS. 11 and 12 are graphs showing the surface magnetic flux density of each sample at predetermined angular positions. The graph of FIG. 11 shows the surface magnetic flux density of each sample at a relative angular position of 22.5° with reference to the angular position R0. The graph of FIG. 12 shows the surface magnetic flux density of each sample at a relative angular position of 25.625° with reference to the angular position R0. In the graphs of FIGS. 11 and 12, the horizontal axis is the ratio (w/W2) of the reference surface length w of the perpendicular reference surface 35 of each sample, and the vertical axis is the ratio of the surface magnetic flux density of each sample to the surface magnetic flux density of the sample 0.

In the graphs of FIGS. 11 and 12, the surface magnetic flux densities of the samples 11 to 13 are equal to the surface magnetic flux density of the sample 0 at both of the angular positions (22.5° and 25.625°).

From the simulation results described above, it has been confirmed that even though there is a difference in the dimension of the perpendicular reference surface 35 of the permanent magnet 30, there is almost no change in surface magnetic flux density, and variations in the dimension of the perpendicular reference surface 35 do not much affect the surface magnetic flux density.

Therefore, even though variations occur in the dimension of the perpendicular reference surface 35, variations in the characteristics of the IPM motor 1 are prevented.

In addition, since it is not necessarily required to form the perpendicular reference surface 35 with a high dimensional accuracy, a positioning operation or a processing operation is facilitated, and it is possible to easily form the perpendicular reference surface 35.

Furthermore, even when the permanent magnet 30 is designed so as to obtain desired motor characteristics, it is possible to select the dimension of the perpendicular reference surface 35 with a certain degree of freedom. This implies that the freedom of shape of the inner peripheral surface 34 of the permanent magnet 30 is high.

The rotor according to the present disclosure is not limited to the embodiment described above, and can be modified in various forms.

For example, it is possible to appropriately increase or decrease the number of the poles or the number of the slots of the IPM motor. In addition, in the embodiment described above, the motor (electric motor) which is one type of rotating electrical machine has been described; however, the present disclosure can be applied also to a generator which is one type of rotating electrical machine.

What is claimed is:

1. A permanent magnet having an arc shape cross section defined by an outer arc, an inner arc, and a pair of end sides connecting an end point of the outer arc and an end point of the inner arc, and including a perpendicular reference surface provided in an inner peripheral surface defined by the inner arc and perpendicular to a direction of a bisector of an opening angle of the inner arc in the cross section, wherein the inner arc is an arc on the side of the center of curvature of the permanent magnet, the outer arc is a continuously curved arc on the opposite side of the center of curvature of the permanent magnet, w is a length of the perpendicular reference surface in a direction orthogonal to the direction of the bisector, W2 is a separation distance between end points of the inner arc, and the value of w/W2 is 0.49 to 1.00.

2. The permanent magnet according to claim 1, wherein the permanent magnet is radially magnetized with reference to a virtual center positioned close to the inner arc in the cross section.

3. The permanent magnet according to claim 1, wherein a range of an opening angle θ of the inner arc is $10° \leq θ \leq 90°$.

4. A rotating electrical machine comprising:

a rotor having a shaft and a rotor core;

a plurality of permanent magnets attached to the rotor core to surround the shaft; and a stator disposed on an outer periphery of the rotor and having a plurality of coils, wherein each of the permanent magnets has an arc shape cross section defined by an outer arc, an inner arc, and a pair of end sides connecting an end point of the outer arc and an end point of the inner arc, and includes a perpendicular reference surface provided in an inner peripheral surface defined by the inner arc and perpendicular to a direction of a bisector of an opening angle of the inner arc in the cross section, the inner arc is an arc on the side of the center of curvature of the permanent magnet, the outer arc is a continuously curved arc on the opposite side of the center of curvature of the permanent magnet, and for each of the permanent magnets, w is a length of the perpendicular reference surface in a direction orthogonal to the direction of the bisector, W2 is a separation distance between end points of the inner arc, and the value of w/W2 is 0.49 to 1.00.

5. The rotating electrical machine according to claim 4, wherein for each of the permanent magnets, the inner arc side of the magnet is arranged to face an outer peripheral surface of the rotor core.

* * * * *